Patented June 9, 1953

2,641,590

UNITED STATES PATENT OFFICE 2,641,590

CARBON MONOXIDE COPOLYMERS AND A CATALYTIC PROCESS FOR THEIR PREPARATION

Ernest L. Little, Jr., Wilmington, Del., assignor to E. I. du Pont de Nemours & Company, Wilmington, Del., a corporation of Delaware No Drawing. Application August 18, 1950, Serial No. 180,301

24 Claims. (Cl. 260—63)

This invention relates to new chemical processes involving carbon monoxide and to certain of the resulting products.

Because of the abundant availability, chemical reactivity, and low cost of carbon monoxide, its chemistry has been receiving increased attention in recent years. Today continuing exploration, particularly on the so-called "oxo" process, is laying the foundation for the development of major industries based on this chemical, especially as a source of the so-called petroleum type hydrocarbons.

Another phase of carbon monoxide chemistry which has been broadly investigated is its copolymerization with monoolefins. Major aspects of this work, including the necessity of using a free radical generating type of catalyst, are described in detail in U. S. Patent 2,495,286. Considerable is also known regarding certain derivatives of these performed olefin/carbon monoxide polymers, particularly with nitrogen-containing materials as disclosed in detail in U. S. Patent 2,495,255.

The reactions of carbon monoxide with nitrogenous compounds have also been investigated to a limited degree. For instance, the courses of its reactions with ammonia, primary, secondary, and tertiary amines are known and the products are indeed useful. Specifically, with ammonia, the reaction can be made to yield urea or hydrocyanic acid; and with primary, secondary, and tertiary amines, there can be obtained ureas and formyl derivatives, depending upon the operating conditions.

More recently, there has been discovered the possibility of preparing semicarbazide and hydrazodicarbonamide among other nitrogenous products through the reaction of hydrazine with carbon monoxide. However, nowhere in the art has there yet been taught the preparation of useful nitrogen containing resins by the alkali metal catalyzed reaction of basic ammonia type compounds with monoolefins and carbon monoxide. Similarly, in none of the prior art has there yet been taught the preparation of useful grease-like and wax-like materials by the alkali metal catalyzed reactions of carbon monoxide with monoolefins.

The teachings of the art are completely silent on the alkali metal catalyzed reactions of carbon monoxide with other reactive materials, particularly monoolefins and amines. In fact, certain of the reported investigations indicate that little, if any, catalytic effect can be expected for such systems. Specifically, Rokityanski, J. Appld. Chem. (U. S. S. R.) 21, 139, 1948, clearly shows that carbon monoxide is a strong inhibitor for the well-known sodium catalyzed polymerization of butadiene.

It is an object of this invention to provide new chemical processes involving carbon monoxide. Another object is to provide a new catalytic process for reacting carbon monoxide with certain other reactive materials. A further object is to provide a novel catalytic process for the preparation of nitrogen-containing resins by the direct reaction of carbon monoxide with certain other reactive materials. A still further object is to provide novel nitrogen-containing polymers. An additional object is to provide useful grease-like and wax-like materials by the direct catalyzed reaction of carbon monoxide with certain other reactive materials. Other objects will appear hereinafter.

The objects of this invention are accomplished by reacting carbon monoxide with a monoolefin at an elevated temperature under pressure in the presence of an alkali metal catalyst. Novel nitrogen-containing polymers are obtained by reacting carbon monoxide with a monoolefin and a basic ammonia-type compound at temperatures of at least 200° C. under a pressure of at least 200 atmospheres in the presence of an alkali metal catalyst.

It has now been found that alkali metals constitute surprisingly effective catalysts for the reactions of carbon monoxide with certain other reactive materials. More specifically, it has been found that alkali metals are particularly effective in catalyzing the reaction of carbon monoxide with monoolefins at a temperature of at least 200° C. under a pressure of at least 250 atmospheres and, if the temperature is less than 250° C. and the pressure less than 1000 atmospheres, in the presence of a basic ammonia-type compound also. The new nitrogen-containing polymers formed under the latter conditions also constitute a part of this invention.

The term "ammonia-type compound" is used herein in its usual and accepted sense to denote ammonia and amines (see for example Karrer's Organic Chemistry, English translation, (1938, 20). The catalysts used herein include the elementary alkali metals, as well as the hydrides and the organo, particularly hydrocarbo, compounds and complexes thereof.

As pointed out above, it is necessary to carry out the process of this invention under superatmospheric pressures. Hence, the operating equipment will include the normally used pressure resistant reaction vessels equipped with agitators, if desired, or other means of mixing the contents, heating elements and, of course, pumps, compressors, and the like, for obtaining the desired reaction pressures. If desired, particularly in the case of continuous operations, other pumps or injectors may be provided for adding solutions or suspensions of the alkali metal catalyst as well as additional basic ammonia type compounds to the reaction zone.

The reactants to which the process of this invention is applied comprise carbon monoxide and an alkali metal catalyst usually in an inert liquid reaction medium, e. g., an aromatic hydrocarbon, with at least one other reactive material, particularly with at least one monoolefinic hydrocarbon alone or together with at least one basic ammonia-type compound. These reactants may be brought into mutual contact in a reaction zone in any order of addition and may be preheated or not, separately or mixed, before reaching the reaction zone. The following more detailed descriptions illustrate one specific manner of carrying out the batchwise operations of the process of this invention.

A pressure resistant vessel is charged with the desired alkali metal catalyst and usually an inert liquid reaction medium. This charging operation is preferably carried out after purging the reaction vessel of air with de-oxygenated nitrogen or other inert gas. The reaction vessel is then closed, evacuated and cooled, and the desired monoolefinic hydrocarbon then distilled in. The reactor is then closed, placed in a shaker machine, provided with a heater and connected to a source of carbon monoxide under pressure and, if desired, a similar source of monoolefinic hydrocarbon under pressure. Controlling and recording thermocouples are placed in position, the vessel pressured with carbon monoxide to the desired pressure, and heating and agitation started. The course of the reaction may be followed by the pressure drop due to utilization of carbon monoxide.

The pressure may be maintained in the desired range by any one of several means such as by intermittent addition of the monoolefinic hydrocarbon from high pressure storage as needed or similarly by intermittent addition of the carbon monoxide from high-pressure storage as needed or by simultaneously injecting the monoolefinic hydrocarbon and the carbon monoxide from high-pressure storage. At the end of the reaction, which is determined by a cessation of pressure drop, the vessel is cooled, bled to atmospheric pressure, opened, and the reaction mixture discharged. The catalyst is separated by filtration in those instances where it is insoluble, the inert liquid reaction medium removed by distillation and the product obtained as the resultant residue.

If desired, instead of separately charging the monoolefin to the reaction vessel and then separately pressuring the carbon monoxide into the reaction zone, the carbon monoxide and the desired monoolefinic hydrocarbon or hydrocarbons may be pre-mixed in a high pressure reservoir in any desired proportions and the mixture pressured directly as such to the reaction zone as desired and as needed.

For carrying out the process of this invention in the manner previously pointed out to be particularly outstanding, i. e., in the presence of a basic ammonia-type compound, such compounds may be charged to the reaction vessel along with the inert reaction medium. This is normally done for those basic ammonia-type compounds that are liquids at room temperature under atmospheric pressure. For those basic ammonia-type compounds, which are normally gaseous at room temperature, it is usually preferred to pressure them directly to the closed reaction vessel either before, along with, or after the charging with the monoolefinic hydrocarbon or hydrocarbons. In such instances, the reaction vessel can be fitted with an additional pressure line, i. e., to a source of the basic ammonia-type compound or compounds under pressure. Thus, during the reaction, the operating pressure may be maintained in any desired range by intermittent addition of the monoolefinic hydrocarbon or hydrocarbons, carbon monoxide, and the basic ammonia-type compound or compounds, either independently or together. When a basic ammonia-type compound is used, the reaction is carried out as previously described and the product isolated in the same fashion. Any unreacted basic ammonia-type compound is removed together with the inert reaction medium and the new product obtained as before as the residue.

The following examples in which the parts given are by weight unless otherwise specified serve to illustrate and not to limit the process of this invention and the novel products obtained therefrom.

*Example I*

A steel reactor fabricated for operations under high pressures and lined with a silver or copper liner of internal capacity corresponding to 400 parts of water is charged with four parts of sodium hydride and 100 parts of freshly distilled toluene. The reactor is then flushed with nitrogen, evacuated and cooled in a solid carbon dioxide/methanol cooling bath. Fifty (50) parts of ethylene are then distilled in, and the reactor is connected to a source of carbon monoxide under high pressures. The reactor is then heated to 275° C. and maintained at this temperature with shaking under a constant pressure of approximately 1,000 atmospheres of carbon monoxide for 16 hours. At the end of this time, the reactor is closed, cooled to room temperature, vented to the atmosphere and the liquid product removed and filtered to separate the catalyst. The toluene solvent is removed from the filtrate by distillation. There is thus obtained as residue 15.1 parts of an ethylene/carbon monoxide grease, which, by analysis, is found to contain ethylene and carbon monoxide in a combined ratio of 81.8/18.2 and to exhibit a molecular weight of approximately 550.

A similar reaction utilizing four parts of sodium as the catalyst yielded 13.5 parts of an ethylene/carbon monoxide grease which, by analysis, is found to contain ethylene and carbon monoxide in an 84/16 combined basis and to exhibit an average molecular weight of 645. Additional similar reactions were carried out at 250° C. using lithium and sodium anthracene complex respectively as the catalysts and yielded respectively 11.2 parts of an 81.5/18.5 ethylene/carbon monoxide grease exhibiting a molecular weight of 730 and 9.5 parts of a 74.5/25.5 ethylene/carbon monoxide grease exhibiting an average molecular weight of 988.

Infrared analyses of films of these copolymers have demonstrated the presence of combined carbonyl groups, as well as combined benzyl groups—the later fact, of course, suggests that the solvent, i. e., toluene, acts as a chain transfer agent, i. e., effectively terminates a growing polymer chain. These low molecular weight, monoolefin/carbon monoxide polyketones can be easily reductively aminated with hydrogen and ammonia, primary and/or secondary amines, to the corresponding polymeric poly-primary, poly-secondary, and poly-tertiary polyamines as disclosed in U. S. Patent 2,495,255.

*Example II*

A high-pressure reactor similar to that described previously in Example I is charged with 100 parts of freshly distilled toluene and four parts of lithium metal, and the reactor closed, flushed with nitrogen and connected to a source of ethylene/carbon monoxide mixed gas under high pressure. The reactor is heated to 250° C. and maintained at this temperature for a period of 16 hours under a pressure of 1,000 atmospheres of the 97/3 ethylene/carbon monoxide mixed gas. At the end of this time, the reactor is cooled to room temperature, bled to atmospheric pressure, opened, and the product removed. This product, a mixture of solid and dissolved polymer, toluene and catalyst, is warmed with 173.4 additional parts of toluene, and the resulting solution filtered to remove the catalyst. An excess of methyl alcohol is then added to the filtrate, and the resulting precipitate removed by filtration. After drying, there is thus obtained 18.8 parts of a solid polyketone which melts between 70 and 73° C. Analysis indicates this solid product to contain ethylene and carbon monoxide in an 88.4/11.6 ratio and to exhibit an average molecular weight of 1960.

Further similar reactions using respectively sodium and sodium hydride as catalysts yield, respectively, 0.8 part of a 94.2/5.8 ethylene/carbon monoxide polyketone melting at 85° C. to 88° C. and exhibiting an average molecular weight of 2180 and 13.4 parts of a 96.2/3.8 ethylene/carbon monoxide polyketone melting at 86–89° C. and exhibiting an average molecular weight of 1690.

Another similar run carried out using lithium as the catalyst at 200° C. yields 3.4 parts of a 91/9 ethylene/carbon monoxide polyketone melting at 95–97° C. and exhibiting an average molecular weight of 2880. Another run carried out in the same general fashion using sodium-anthracene complex as the catalyst at 250° C. and a 94/6 ethylene/carbon monoxide gas mixture produces 11.3 parts of a 93.2/6.8 ethylene/carbon monoxide polyketone.

Several other runs carried out in the same general fashion as described above with various catalysts of the class disclosed herein, at different operating temperatures, under 1000 atmospheres pressure of ethylene/carbon monoxide mixed gases of varying percentage compositions as well as the properties of the products prepared therefrom are summarized in the following table:

| Catalyst | Temp., °C. | E/CO* Ratio in Mixed Gas | Yield | Properties of E/CO* Polyketones Obtained | | |
|---|---|---|---|---|---|---|
| | | | | M. P., °C. | E/CO,* Ratio | Average M. W. |
| Lithium hydride | 250 | 95/5 | 17.0 | | 98.8/1.2 | 1,555 |
| Sodium Anthracene | 250 | 97/3 | | 99–102 | 89.5/10.5 | 2,445 |
| Do | 250 | 95/5 | | | 95.8/4.2 | 1,820 |
| Lithium | 250 | 90/10 | | 58–71 | 88.6/11.4 | 2,060 |

* Ethylene/carbon monoxide.

As in the case with the ethylene/carbon monoxide polyketones described previously in Example I, infrared analyses on film samples of these various polyketones have demonstrated the presence of carbonyl groups, as well as benzyl groups. Again the presence of the latter suggests that the solvent, toluene, is acting as a chain transfer agent. Samples of these olefin/carbon monoxide polyketones have similarly been reductively aminated to polymeric polyamines as disclosed broadly in U. S. Patent 2,495,255.

*Example III*

A high-pressure reactor similar to that described previously in Example I is charged with 150 parts of triethylamine and three parts of sodium. The reactor is closed, flushed with nitrogen, evacuated, and cooled in a solid carbon dioxide/methanol bath. Fifty (50) parts of ethylene is then distilled in and the reactor, after being connected to a source of carbon monoxide under pressure, is heated with shaking for 16 hours at 250° C. under a pressure of 250 atmospheres of carbon monoxide. During this time, a total pressure drop of 125 atmospheres is observed in the carbon monoxide pressure. The reactor is cooled to room temperature, vented to atmospheric pressure, opened, and the liquid product removed. The catalyst is removed by filtration and the filtrate separated by fractionation. A total of 31.7 grams of a liquid product boiling above the boiling point of triethylamine (89° C.) at atmospheric pressure is obtained. Fractionation of this higher boiling liquid product by fractional distillation yielded the following cuts:

| Cut No. | B. P., °C. (Atmospheric pressure) | Weight | $n_D^{25}$ |
|---|---|---|---|
| 1 | 94–96 | 7.5 | 1.4021 |
| 2 | 105–110 | 2.7 | 1.4066 |
| 3 | 120–140 | 3.2 | 1.4134 |
| 4 | 155–160 | 2.4 | 1.4185 |
| 5 | 170–180 | 5.4 | 1.4248 |
| residue | | 10.5 | |

The products identified as cuts 2, 3, 4, and 5 exhibited positive carbonyl tests with 2,4-dinitrophenyl hydrazine reagent and were also found to be nitrogen-containing.

Five runs were carried out in a similar manner to that described above varying only in that four parts of sodium catalyst were used in each charge, and each reaction was carried out under 1,000 atmospheres of carbon monoxide pressure. The products obtained in each run boiled above the boiling point of triethylamine (i. e., 89° C. at atmospheric pressure), were combined and separated into the following liquid products by fractional distillation:

| Cut No. | B. P., °C. | Pressure (mm.) | Wt. (g.) | $n_D^{25}$ |
|---|---|---|---|---|
| 1 | 94–100 | atmospheric | 1.6 | 1.4065 |
| 2 | 103–110 | do | 4.1 | 1.4130 |
| 3 | 120–130 | do | 3.5 | 1.4140 |
| 4 | 145–155 | do | 2.2 | 1.4220 |
| 5 | 155–160 | do | 4.1 | 1.4301 |
| 6 | 55–120 | 0.6 | 29.2 | |
| residue | | | 55 | |

These liquid nitrogen-containing polymeric products exhibit the following properties as determined by the following analysis:

| Cut No. | N. E. | M. W. | Percent Carbon | Percent Hydrogen | Percent Nitrogen | Percent Oxygen (diff.) |
|---|---|---|---|---|---|---|
| 1 | 126.6 | | 73.67 | 14.80 | 10.23 | 1.30 |
|   |       | | 73.47 | 14.79 | 11.20 | 0.54 |
| 2 | 209.7 | 137 | 77.07 | 14.57 | 6.81 | 1.55 |
|   | 208.8 | 141 | 76.96 | 14.49 | 6.76 | 1.82 |
| 3 | 213.4 | | 75.68 | 14.15 | 6.91 | 3.26 |
|   | 214.2 | | 75.99 | 14.14 | 7.02 | 2.85 |
| 4 | 272.4 | 161 | 73.51 | 13.62 | 7.80 | 5.07 |
|   | 272.1 | 161 | 73.52 | 13.42 | 7.70 | 5.36 |
| 5 | 386.2 | 164 | 70.80 | 12.79 | 8.34 | 8.07 |
|   | 387.1 | 161 | 70.41 | 12.63 | 8.29 | 8.62 |
| residue | | 557.7 | 76.91 | 10.80 | 1.79 | 10.50 |
|         | | 556.5 | 77.03 | 10.70 | 1.51 | 10.76 |

Example IV

A high-pressure reactor similar to those described previously is charged with 150 parts of tri-n-butylamine and five parts of sodium metal. The reactor is then closed, flushed with nitrogen, and connected to a 95/5 ethylene/carbon monoxide gas mixture under pressure. The reactor is heated for 16 hours at 275° C. under a total mixed gas pressure of 1,000 atmospheres. At the end of this time, the reactor is cooled to room temperature, vented to atmospheric pressure, and the grease-like polymeric product removed. There is thus obtained 34.8 parts of a nitrogen- and carbonyl-containing grease-like polymer which is found by analysis to contain 76.68% and 76.71% carbon, 12.63% and 13.42% hydrogen, 1.09% and 0.92% nitrogen, and 9.57% and 8.98% oxygen (by difference) and to exhibit an average molecular weight of 748.

Example V

A high-pressure reactor similar to those described previously is charged with 100 parts of triethylamine and five parts of sodium metal. The reactor is then closed, flushed with nitrogen, and connected to a 95/5 ethylene/carbon monoxide gas mixture under pressure. The reactor is heated for 16 hours at 250° C. under a total mixed gas pressure of 1,000 atmospheres. At the end of this time, the reactor is cooled to room temperature, vented to atmospheric pressure, and the grease-like, nitrogen-containing, polymeric product removed.

Example VI

A high-pressure reactor similar to those described previously is charged with 100 parts of N,N-diethylaniline and five parts of sodium metal. The reactor is then closed, flushed with nitrogen, and connected to a 95/5 ethylene/carbon monoxide gas mixture under pressure. The reactor is heated for 16 hours at 250° C. under a total mixed gas pressure of 1,000 atmospheres. At the end of this time the reactor is cooled to room temperature, vented to atmospheric pressure, and the grease-like, nitrogen-containing, polymeric product removed.

Example VII

A high-pressure reactor similar to those described previously is charged with 100 parts of pyridine and five parts of sodium metal. The reactor is then closed, flushed with nitrogen, and connected to a 95/5 ethylene/carbon monoxide gas mixture under pressure. The reactor is heated for 16 hours at 250° C. under a total mixed gas pressure of 1,000 atmospheres. At the end of this time, the reactor is cooled to room temperature, vented to atmospheric pressure, and the grease-like, nitrogen-containing, polymeric product removed.

Example VIII

A high-pressure reactor similar to those described previously is charged with 100 parts of n-butylamine and five parts of sodium metal. The reactor is then closed, flushed with nitrogen, and connected to a 95/5 ethylene/carbon monoxide gas mixture under pressure. The reactor is heated for 16 hours at 250° C. under a total mixed gas pressure of 1,000 atmospheres. At the end of this time the reactor is cooled to room temperature, vented to atmospheric pressure, and the grease-like, nitrogen-containing, polymeric product removed.

As has been stated previously, this invention is generic to the alkali metal catalyzed reactions of carbon monoxide with certain other reactive materials. The use of alkali metal catalysts in the reactions of carbon monoxide is particularly effective in the reactions between carbon monoxide and monoolefinic hydrocarbons under superatmospheric pressures. While this phase of this invention has been illustrated with particular reference to ethylene, it is to be understood that this invention is generic to the use of alkali metal catalysts in the reactions of carbon monoxide with hydrocarbons containing a single carbon to carbon double bond as the sole acyclic unsaturation and having from 2 to 8 carbon aoms. Because of their greater reactivity, it is preferred to use terminally unsaturated monoolefinic hydrocarbons, i. e., those in which the single acyclic carbon to carbon double bond is between the carbon atoms in the 1- and 2-positions, and preferably those compounds containing a terminal methylene group doubly bonded to its neighboring chain carbon atom.

Other examples of suitable monoolefinic hydrocarbons in addition to ethylene given in the examples include propene-1, butene-1, butene-2, 2-methylpropene-1, hexene-1, and the like. The process of this invention is particularly outstanding when applied to the lower monoolefins, especially those which are normally gaseous.

The monoolefins may contain small amounts of contaminants which are normally encountered therein in the commercially available grades. Such contaminants may include the corresponding saturatd hydrocarbon such as ethane, propane and the like, nitrogen, hydrogen, carbon dioxide, or oxygen. However, oxygen in concentrations above 1,000 parts per million is detrimental to the reaction. Consequently, monoolefins purified to contain less than 100 parts per million, generally less than 50 parts per million, and preferably less than 10 parts per million of oxygen are employed.

A particularly useful embodiment of this invention resides in the alkali metal catalyzed reactions of carbon monoxide with monoolefinic hydrocarbons together with basic ammonia-type compounds. The new nitrogen-containing resins thereby produced also constitute a part of this invention. While this phase of the invention has been illustrated in the examples with particular reference to certain specific amines, it is to be understood that this invention is generic to the alkali metal catalyzed reactions of carbon monoxide with monoolefinic hydrocarbons together with all basic ammonia-type compounds, that is ammonia and amines.

Particular examples of such basic ammonia-type compounds are ammonia; primary alkylamines, e. g., methyl-, ethyl-, octyl-, dodecyl-, octadecylamines; secondary alkylamines, e. g., dimethyl-, liethyl-, methylethyl-, ethylhexyl-, dioctadecylamines; tertiary alkylamines, e. g., trimethyl-, triethyl-, tripropyl-, tri-n-hexyl-amines; cycloaliphatic amines, e. g., cyclohexylamine, dicyclohexylamine, N-methylcyclohexylamine; aralkylamines, e. g., benzylamine, di-2-phenylethylamine; aromatic primary amines, e. g., aniline; alkaryl primary amines, e. g., p-ethylaniline; secondary aromatic amines, e. g., diphenylamine; secondary alkarylamines, e. g., 2,2'-ditolylamine; tertiary aromatic amines, e. g., triphenylamine; polyamines, e. g., ethylenediamine, hexamethylenediamine, N,N'-diethylethylenediamine, p-phenylenediamine, 1,2,3-benzenetriamine, triethylene-tetramine; cyclic amines, e. g., pyrrolidine, piperidine, piperazine, morpholine; heterocyclic amines, e. g., alpha-aminothiophene, 2-aminothiazole, 2-aminopyridine; hydrazines, e. g., hydrazine, 2-propylhydrazine and the like. Because of the lack of complicating side reactions, as well as their readier availability, it is preferred to use ammonia and the primary, secondary and tertiary amines described above which are unsubstituted, i. e., which contain in addition to the amino nitrogen only carbon and hydrogen and in the case of the heterocyclic amines oxygen, nitrogen or sulfur heteroatoms. Of this preferred class of basic ammonia-type compounds, those containing no more than 10 carbons per amino nitrogen are especially preferred.

The catalyst as mentioned previously can be any alkali metal or the hydrides or organo, preferably hydrocarbo, compounds thereof. Specific examples of these materials include the alkali metals themselves, i. e., the metals of group I-A of the periodic table, e. g., lithium, sodium, potassium, rubidium, and cesium; the hydrides of these metals, e. g., lithium, sodium, potassium hydrides. The hydrocarbo compounds of these metals, e. g., the alkali metal alkyls, aryls, aralkyls, such as, butylpotassium, phenyllithium, benzylsodium, and the like. The hydrocarbo complexes or hydrocarbon addition compounds of these alkali metals may also be used such as, sodiumanthracene, lithiumanthracene and sodiumacridine. The hydrocarbo alkali metal catalysts can also be prepared in situ by charging the respective alkali metal and other hydrocarbo metallic derivatives which react with the alkali metals to form the corresponding hydrocarbo alkali metal compound, for instance, the catalyst may be prepared in situ by charging metallic sodium, lithium, and potassium in conjunction with diphenylmercury, tetraphenyltin, diethylzinc, triphenylboron, and the like. The amount of catalyst used will generally vary from 0.1% to 20% by weight of the reactants, and preferably from 1 to 10% and most preferably from 2 to 5% on the same basis.

The temperatures and pressures employed in the practice of the process of this invention are interdependent variables. As a rule, the process is operated at temperatures above 200° C. and preferably above 250° C. at superatmospheric pressures preferably in the range of 1,000 atmospheres or higher. The upper limits of temperature and pressure are not critical to the process and are limited solely by the availability of the requisite reaction equipment.

The reactants can be used in any desired reactive proportions since the heart of the invention resides in the new catalyst. These new catalysts are effective as such in the manner and under the reaction conditions previously discussed regardless of the relative proportions of the reactants. However, for practical purposes to prepare products distinguishable from the respective homopolymers, it is necessary that at least one mole of carbon monoxide be used for every 150 moles of monoolefin. Products containing more than one mole of carbon monoxide for every mole of combined monoolefin are not normally prepared. However, in the preparation of the products containing appreciable quantities of combined carbon monoxide of the order of over 11 to 12%, the starting reaction mixtures normally will contain an excess of carbon monoxide. These compositional ranges, of course, vary markedly on a weight percentage basis as the nature of the monoolefin varies. However, for the shortest chain monoolefin, i. e., ethylene, these figures on a weight basis represent polymers containing from 0.6 to 50.0% combined carbon monoxide.

In the case of those products prepared by the process of this invention, when a basic ammonia type compound is used, the relative proportions are again independent. However, for practical purposes, because of their more desirable properties, those nitrogen-containing resins containing from 1 to 15% combined nitrogen are preferred. The nitrogen-containing resins can contain from 0.6 to 50.0% combined carbon monoxide when ethylene is used.

The nature of the products prepared in all cases is dependent upon many factors including in addition to the relative proportions of the reactants, the particular catalyst being used, and the temperature and pressure conditions under which the reaction is carried out. For instance, as previously discussed in Example II, when a 97/3 by weight mixture of ethylene and carbon monoxide under a pressure of 1,000 atmosphere is heated for 16 hours at 250° C. using lithium metal, or sodium metal, or sodium hydride or sodium-anthracene complex and at 200° C. using lithium metal catalyst, various ethylene/carbon monoxide copolymers containing, respectively, ethylene and carbon monoxide in 88.4/11.6, 94.2/5.8, 96.2/3.8, 95.8/4.2, and 91/9 are obtained. These copolymers further vary in molecular weight. The respective average molecular weight values for these copolymers are 1960, 2180, 1690, 2445, and 2880.

To illustrate further the dependence of the nature of the products on all the reaction conditions, attention is directed to Example I. In these experiments, a given quantity of ethylene was reacted with carbon monoxide under varying conditions of temperature and pressure with various catalysts. In these particular experiments, although highly accurate quantitative data can neither be calculated nor obtained on the particular systems involved, approximate calculations under the most unfavorable set of conditions indicate that, initially at least, there is an excess of carbon monoxide present. As indicated by the properties listed, these products are generally relatively low in molecular weight and contain appreciably higher quantities of combined carbon monoxide than is the case in the later experiments where mixed gases are used which contain an excess of the monoolefin. Even under these different conditions, the operating temperature and the particular catalyst have a profound effect in both the physical properties and the chemical composition of the product formed. Finally, in those instances where a basic ammonia type compound is used, although the operating conditions as previously pointed out can be somewhat milder, the same general interdependent properties of chemical composition on the relative proportion of the reactants, the operating temperature, and the particular catalyst being used are evident. Furthermore, the data given in Examples III through VIII indicate that, in general, as the combined nitrogen percentage increases the molecular weight of the nitrogen-containing resin products decrease. Those nitrogen-containing resins having relatively high percentages of nitrogen of the order of 7% nitrogen or higher are generally relatively low molecular weight, high boiling liquids. On the other hand, those products containing relatively low percentages of combined nitrogen of the order of 1 to 2% are appreciably higher molecular weight, grease-like polymers.

An inert solvent or diluent is also preferably used. Suitable examples of such materials include inert hydrocarbons free from non-benzenoid unsaturation, such, as aliphatically saturated hydrocarbons, i. e., those containing only benzenoid type unsaturation. Such hydrocarbons include the aromatic and saturated acyclic and alicyclic hydrocarbons, preferably those which are liquid, such as kerosene, cyclohexane, benzene, toluene, and the like. As pointed out in Example I, certain of these inert reaction solvents can, under the conditions of reaction, serve as chain transfer agents and effectively terminate growing polymer chains thereby directing the reaction towards the production of useful low molecular weight greases and resins.

A critical factor in the processes of this invention is the pressure. Experience has shown that pressure of at least 250 atmospheres is essential even when a basic ammonia-type compound is present if practicable yields are to be obtained. When no basic ammonia-type compound is present, the operating pressures must be 1,000 atmospheres or higher. Best results under both sets of conditions are usually obtained in the range of 1,000 atmospheres although higher pressures up to 3,000 to 8,000 atmospheres or more may be used. In general, the autogenous pressure developed by the reactants at reaction temperature is insufficient, and it is, therefore, necessary to apply extraneous pressure. This is usually done by compression of the normally gaseous reactants including, of course, carbon monoxide and the low monoolefinic hydrocarbons when such are used.

The reaction temperature is also a critical factor. A temperature of at least 200° C. is essential when a basic ammonia-type compound is present and at least 250° C. in the absence of such a compound. The reaction time depends upon the choice of reactants, the particular catalyst being used, the temperature and pressure. In general, as described previously at a temperature in the range of 200-300° C. under pressures in the range of 250 to 1,000 atmospheres, satisfactory yields are obtained within 10 to 20 hours, although longer times and higher temperatures up to 600-700° C. may be used if desired.

The materials prepared by the processes of this invention are useful in a wide range of fields. For instance, the low molecular weight waxes and grease-like materials obtained by the alkali metal catalyzed reactions of the monoolefinic hydrocarbons with carbon monoxide are useful as pressure lubricants or plasticizers for vinyl resins, particularly the halogen-containing vinyl resins as described in somewhat more detail in the copending application of Vaala, Serial No. 59,433, filed November 10, 1948.

On the other hand, these polymeric polyketones can also be used as intermediates in the preparation of polymeric polyamines useful for instance, in paper coating, waterproofing, and impregnating compositions and the like. These polymeric polyamines can be prepared as described in greater detail in U. S. Patent 2,495,255 by the reductive amination of these polymeric polyketones.

The new nitrogen-containing resins of this invention, i. e., those prepared by the alkali metal catalyzed reaction between carbon monoxide and monoolefinic hydrocarbons together with basic ammonia-type compounds may be used as such in many of the above-described uses. Their salts with the simple mineral acids may also be used for waterproofing textiles.

As many apparently widely different embodiments of this invention may be made without departing from the spirit and scope thereof, it is to be understood that this invention is not limited to the specific embodiments thereof except as defined in the appended claims.

I claim:

1. A process which comprises reacting carbon monoxide with a monoolefin at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

2. A process which comprises reacting carbon monoxide with a monoolefin at a temperature of at least 250° C. under a pressure of at least 1000 atmospheres in the presence of an elementary alkali metal.

3. A process which comprises reacting carbon monoxide with a monoolefin at a temperature of at least 250° C. under a pressure of at least 1000 atmospheres in the presence of an alkali metal hydride.

4. A process which comprises reacting carbon monoxide with a monoolefin at a temperature of at least 250° C. under a pressure of at least 1000 atmospheres in the presence of sodium hydride.

5. A process which comprises reacting carbon monoxide with a monoolefin at a temperature of at least 250° C. under a pressure of at least 1000 atmospheres in the presence of sodiumanthracene.

6. A process which comprises reacting carbon monoxide with ethylene at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

7. A process which comprises reacting carbon monoxide with ethylene at a temperature of at least 250° C. under a pressure of at least 1000 atmospheres in the presence of an elementary alkali metal.

8. A process which comprises reacting carbon monoxide with ethylene at a temperature of at least 250° C. under a pressure of at least 1000 atmospheres in the presence of an alkali metal hydride.

9. A process which comprises reacting carbon monoxide with ethylene at a temperature of at least 250° C. under a pressure of at least 1000 atmospheres in the presence of sodium hydride.

10. A process which comprises reacting carbon monoxide with ethylene at a temperature of at least 250° C. under a pressure of at least 1000 atmospheres in the presence of sodiumanthracene.

11. A process which comprises reacting carbon monoxide with a monoolefin and a basic ammonia-type compound selected from the class consisting of ammonia and amines at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

12. A process which comprises reacting carbon monoxide with ethylene and a basic ammonia-type compound selected from the class consisting of ammonia and amines at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

13. A process which comprises reacting carbon monoxide with ethylene and a basic ammonia-type compound selected from the class consisting of ammonia and amines at a temperature of at least 250° C. under a pressure of at least 1000 atmospheres in the presence of an elementary alkali metal.

14. A process which comprises reacting carbon monoxide with ethylene and a basic ammonia-type compound selected from the class consisting of ammonia and amines at a temperature of at least 250° C. under a pressure of at least 1000 atmospheres in the presence of an alkali metal hydride.

15. A process which comprises reacting carbon monoxide with ethylene and a basic ammonia-type compound selected from the class consisting of ammonia and amines at a temperature of at least 250° C. under a pressure of at least 1000 atmospheres in the presence of sodium hydride.

16. A process which comprises reacting carbon monoxide with ethylene and a basic ammonia-type compound selected from the class consisting of ammonia and amines at a temperature of at least 250° C. under a pressure of at least 1000 atmospheres in the presence of sodiumanthracene.

17. A process which comprises reacting carbon monoxide with ethylene and an amine at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

18. A nitrogen-containing polymer which is the reaction product obtained by reacting carbon monoxide with a monoolefin and a basic ammonia-type compound selected from the class consisting of ammonia and amines at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

19. A nitrogen-containing polymer which is the reaction product obtained by reacting carbon monoxide with ethylene and a basic ammonia-type compound selected from the class consisting of ammonia and amines at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumacridine.

20. A nitrogen-containing polymer which is the reaction product obtained by reacting carbon monoxide with ethylene and an amine at a temperature of at least 250° C. under a pressure of at least 1000 atmospheres in the presence of a catalyst selected from the class consisting of elementary alkali metals, alkali metal hydrides, alkali metal alkyls, alkali metal aryls, alkali metal aralkyls, sodiumanthracene, lithiumanthracene and sodiumcridine.

21. A process which comprises reacting carbon monoxide with a monoolefin at a temperature of at least 250° C. under a pressure of at least 1000 atmospheres in the presence of sodium.

22. A process which comprises reacting carbon monoxide with ethylene at a temperature of at least 250° C. under a pressure of at least 1000 atmospheres in the presence of sodium.

23. A process which comprises reacting carbon monoxide with ethylene and a basic ammonia-type compound selected from the class consisting of ammonia and amines at a temperature of at least 250° C. under a pressure of at least 1000 atmospheres in the presence of sodium.

24. A process which comprises reacting carbon monoxide with ethylene and an amine at a temperature of at least 250° C. under a pressure of at least 1000 atmospheres in the presence of sodium.

ERNEST L. LITTLE, Jr.

References Cited in the file of this patent

UNITED STATES PATENTS

| Number | Name | Date |
|---|---|---|
| 2,377,779 | Hanford | June 5, 1945 |
| 2,457,279 | Scott | Dec. 28, 1948 |
| 2,495,286 | Brubaker | Jan. 24, 1950 |
| 2,495,292 | Scott | Jan. 24, 1950 |